United States Patent
Hart et al.

[11] 3,868,895
[45] Mar. 4, 1975

[54] DEVICE FOR LOADING A PLASTIC SLEEVE ONTO A MANDREL

[75] Inventors: Robert J. Hart; Milburn L. Hart, both of Tulsa, Okla.

[73] Assignee: Commercial Resins Company, Tulsa, Okla.

[22] Filed: Oct. 12, 1973

[21] Appl. No.: 405,771

[52] U.S. Cl.............. 93/84 TW, 93/84 FF, 53/197
[51] Int. Cl.............................................. B31f 1/08
[58] Field of Search........ 93/82, 77 CL, 77 R, 84 R, 93/84 FF, 84 TW, 94 R, 1 R, 1 WZ; 53/197; 17/42

[56] References Cited
UNITED STATES PATENTS

| | | | |
|---|---|---|---|
| 3,412,523 | 11/1968 | Raymond et al...................... | 53/197 |
| 3,461,640 | 8/1969 | Bonami............................ | 53/197 X |
| 3,709,751 | 1/1973 | Carlson et al......................... | 156/78 |
| 3,719,022 | 3/1973 | Cherio et al...................... | 53/197 X |
| 3,726,059 | 4/1973 | Cherio et al...................... | 53/197 X |

Primary Examiner—Roy Lake
Assistant Examiner—James F. Coan
Attorney, Agent, or Firm—William S. Dorman

[57] ABSTRACT

A device for supporting a mandrel and automatically installing a plastic sleeve thereon in a manner wherein a substantially great length of the plastic sleeve is loaded onto a mandrel of relatively short length. A carrier movably mounted on a track means carries the mandrel for receiving the plastic sleeve therearound, and a sleeve loading assembly reciprocal with respect to the mandrel selectively engages the plastic sleeve for loading thereof onto the outer periphery of the mandrel.

9 Claims, 10 Drawing Figures

DEVICE FOR LOADING A PLASTIC SLEEVE ONTO A MANDREL

BACKGROUND OF THE INVENTION

1. Field of the Invention

This invention relates to improvements in apparatus for installing an outer sleeve on an inner mandrel and more particularly, but not by way of limitation, to a device for loading a substantially great length of outer sleeve onto a mandrel of relatively short length.

2. Description of the Prior Art

It is usually necessary to insulate the outer periphery of a pipe line, or the like, for protection thereof from corrosion and other damage which may deteriorate the pipe. Foam insulation is a desirable type of insulating material for applying to the outer periphery of pipe lines, and is in widespread use today for the protection of the pipe lines, and the like. Of course, it is preferable to cover the outer periphery of the foam insulation material with a protective covering, and plastic film has proven very desirable for this purpose. There are many methods of applying the form insulating material and plastic film to the outer periphery of the pipe available today. For example, the foam material may be sprayed on the outer periphery of the pipe sections at a mill site, or the like, and a plastic film may be wrapped or helically wound around the outer periphery of the foam material for the protection thereof. In other instances, the foam may be covered with a plastic sleeve in much the same manner as the stuffing of a weiner. These methods have certain disadvantages in that application of the insulation material at the mill site requires that the insulated pipe sections be transported to the side of installation of the pipe line, or the like, and the foam material and plastic covering may be damaged during transport. In addition, wrapping of a plastic film around the outer periphery of foam material results in a seam extending longitudinally along the outer periphery of the pipe sections, which frequently causes leakage and the inherent disadvantages thereof.

SUMMARY OF THE INVENTION

A novel method and means of applying foam insulation material around the outer periphery of an installed pipe line and simultaneously covering the foam material with plastic film or a plastic sleeve which overcomes the above disadvantages is set forth in the Ronald E. Carlson et al. U.S. Pat. No. 3,709,751, issued Jan. 9, 1973, and entitled "Pipe Insulating Method and Apparatus". The present invention contemplates a novel apparatus for loading or cramming a relatively great length of sleeve material onto a relatively short mandrel for substantially any desired purpose, and is not limited to the particular purpose as set forth herein.

The novel apparatus comprises a movable carriage for supporting the mandrel in a substantially horizontal position while receiving the plastic sleeve thereon. A loading assembly is interposed between the movable carriage and a supply of plastic sleeve material, and is adapted for receiving a cantilevered portion of the mandrel therein whereby the leading end of the plastic sleeve may be disposed over or around the outer periphery of the mandrel at the initiation of the loading operation. The loading assembly is provided with oppositely disposed gripping means automatically movable in synchronization in alternate directions away from and toward the outer periphery of the mandrel for selectively gripping the plastic sleeve thereagainst. The gripping means are also simultaneously reciprocated with respect to the longitudinal axis of the mandrel in timed relation with the inward and outward movements thereof whereby successive lengths of the sleeve may be loaded or crammed onto the outer periphery of the mandrel in an accordian-type manner. As the length or quantity of the sleeve material is loaded or crammed onto the mandrel and accumulates thereon, the movable carriage moves in a direction away from the loading assembly to expose an additional length of the mandrel for receiving additional quantities of the plastic sleeve thereon until the entire length of the mandrel has been filled with the desired length of plastic sleeve.

DESCRIPTION OF THE PREFERRED EMBODIMENTS

Figure 1:
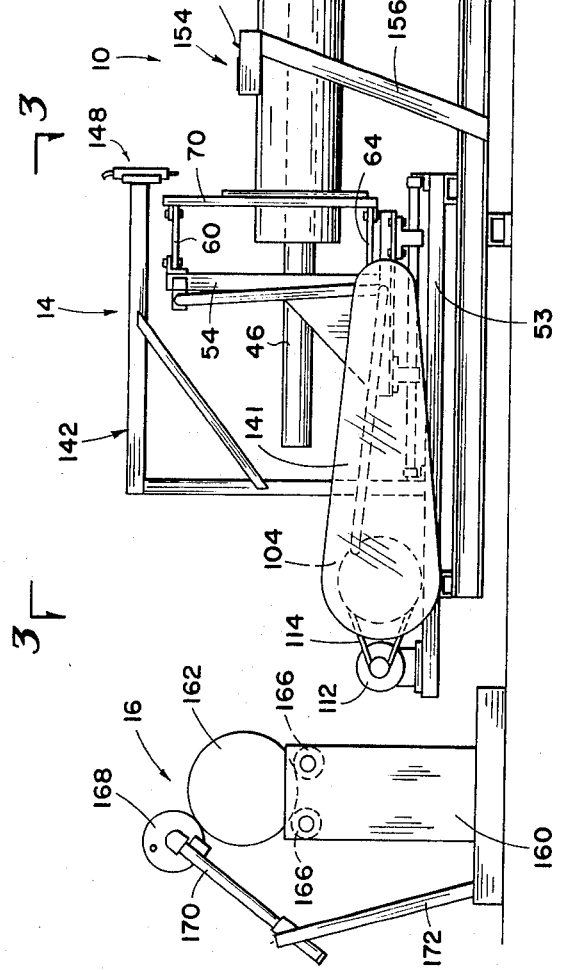
FIG. 1 is a side elevational view of a loading apparatus embodying the invention.

Referring to the drawings in detail, reference character 10 generally indicates a loading apparatus comprising a movable carriage assembly 12, a loading or cramming assembly 14, and a material supply area 16. The carriage 12 may be movably disposed or mounted with respect to the loading assembly 14 in any suitable manner, and as shown herein comprises a suitable base or frame 18 having a first pair of oppositely disposed wheels 20 and 21 journalled thereon and a second pair of oppositely disposed wheels 22 (only one of which is shown in FIG. 1) journalled thereon and longitudinally spaced from the first wheels 20 and 21 whereby the wheels 20, 21 and 22 may roll or ride freely along a pair of substantially parallel, spaced longitudinally extending rails 24 and 26. A first pair of guide brackets 28 and 29 are suitably secured to the opposite sides of the frame 18 in the proximity of the wheels 20 and 21, respectively, and slidably engage the rails 24 and 26 for guiding the wheels 20 and 21 therealong. A second pair of similar guide brackets 30 (only one of which is shown in FIG. 1) are suitably secured to the opposite sides of the frame 18 in the proximty of the wheels 22 and slidably engage the rails 24 and 26 for guiding the wheels 22 therealong. Of course, any suitable guiding means may be provided for facilitating movement of the frame 18 along the rails 24 and 26, as is well known, and there is no intention of limiting the invention to the particular structure shown herein.

Figure 2:
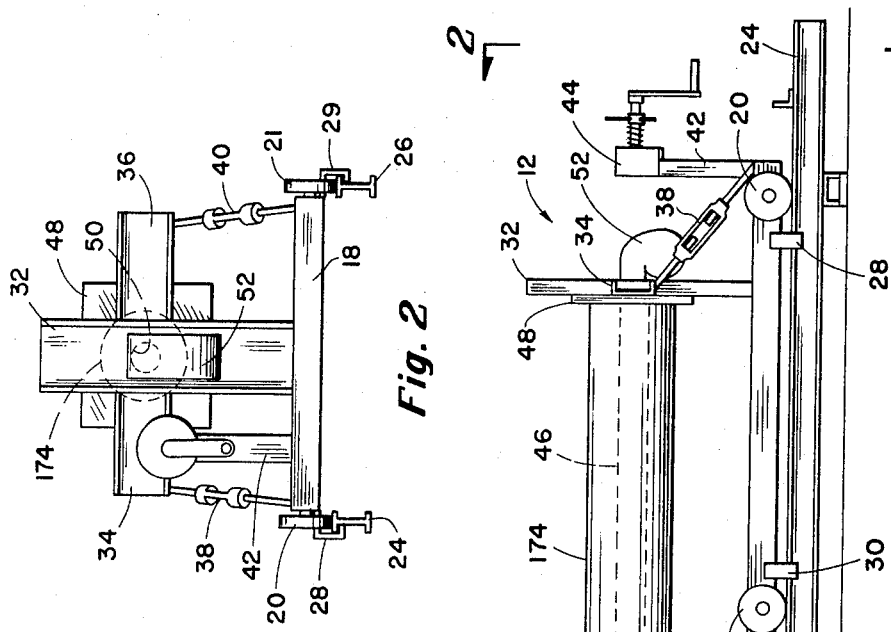
FIG. 2 is a view taken on line 2—2 of FIG. 1.

An upright channel or support member 32 is secured to the base of frame 18 in any suitable manner (not shown) and is preferably centrally disposed between the rails 24 and 26, as particularly shown in FIG. 2. A pair of oppositely disposed cross members 34 and 36 are rigidly secured to the support member 32 and extend substantially horizontally outwardly therefrom. The outer end of the cross member 34 is secured to one edge of the frame 18 by a turnbuckle assembly 38, and the outer end of the cross member 36 is similarly secured to the opposite side of the frame 18 by a second turnbuckle assembly 40 for a purpose as will be hereinafter set forth. A second upright channel or support member 42 is secured to the frame 18 in any well known manner (not shown) for supporting a suitable clutch 44 which is operably connected with the wheel 20 for controlling the rate of speed with which the carriage 12 moves along the rails 24 and 26 in a manner and for a purpose as will be hereinafter set forth.

A sleeve or pipe 46 is welded or otherwise rigidly secured to a plate 48 which in turn is welded or rigidly secured to the support 32. The pipe 46 extends outwardly from the support 32 in a direction toward the loading or cramming assembly 14, and is disposed in a substantially horizontal position. It will be apparent that the outer end of the pipe 46 may tend to sag or bend downwardly toward the ground particularly if the pipe 46 is relatively long. In order to counteract any tendency of the outer end of the pipe 46 to sag, the turnbuckle assemblies 38 and 40 may be utilized in the normal manner for adjusting thr upright position of the support 32 sufficiently for raising the outer end of the pipe 46 in such a manner as to provide a substantially horizontal disposition for the pipe 46. Even though the support 32, plate 48, pipe 46, and the like, are welded together and welded to the frame 18, the turnbuckle assemblies 38 and 40 may efficienctly adjust the position of the pipe 46 in the manner as hereinbefore set forth.

An aperture 50 (FIG. 2) is provided in the support 32 in substantial alignment with the axis of the pipe 46, and is in communication with the interior thereof. A suitable fan or blower 52 is secured to the opposite side of the support 32 with respect to the pipe 46 and is operable to move air through the pipe 46 during a loading operation, as will be hereinafter set forth.

Figures 3, 4:
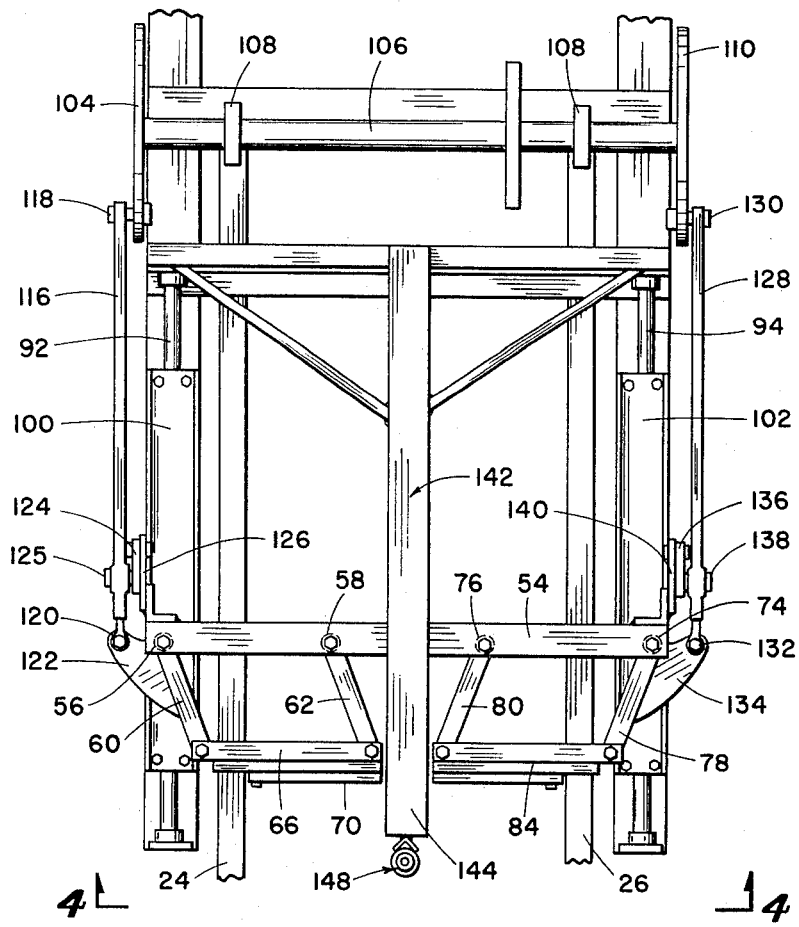
FIG. 3 is a view taken on line 3—3 of FIG. 1.
FIG. 4 is a view taken on line 4—4 of FIG. 3.

The loading or cramming apparatus 14 comprises a substantially rectangular support base member 53 spanning the distance between the rails 24 and 26 and speced thereabove. An upstanding substantially rectangular frame 54 is secured to the base 53 in a manner as will be hereinafter set forth. A first pair of spaced upright rods 56 and 58 are suitably journalled on one side of the frame 54 for rotation about their respective vertical axes. Upper lever arms 60 and 62 are suitably secured to the rods 56 and 58, respectively, for rotating simultaneously therewith. Lower lever arms generally similar to and in spaced alignment with the arms 60 and 62, and only one of which is shown at 64 in FIG. 4, are suitably secured to the opposite ends of the rods 56 and 58 for movement in coordination with the arms 60 and 62. A cross bar 66 is suitably pivotally secured between the outer ends of the arms 60 and 62 as particularly shown in FIG. 3 and a similar bar 68 is pivotally secured to the outer ends of the arms 64. A first upright door 70 is secured to the bars 66 and 68 and the inwardly directed edge thereof is provided with an arcuate recess 72 for a purpose as will be hereinafter set forth.

A second pair of upright rods 74 and 76 are generally similar to the rods 56 and 58 and are suitably journalled on the opposite side of the frame 54 and with respect thereto in a substantially mirror image thereof. A second pair of upper arms 78 and 80 similar to the arms 60 and 62 are suitably secured to the rods 74 and 76, respectively, for rotating simultaneously therewith in a substantially mirror image relationship with respect to the arms 60 and 62. A second pair of lower arms, only one of which is shown at 82 in FIG. 4, similar to the arms 64 are suitably secured to the opposite ends of the rods 74 and 76 and spaced from the arms 78 and 80 in substantial alignment therewith for simultaneous movement therebetween. A cross bar 84 is suitably pivotally secured to the outer ends of the arms 78 and 80, and a similar cross bar 86 is pivotally secured to the outer ends of the arms 82. A second upright door 88 is secured to the bars 84 and 86 and the inwardly directed edge thereof is provided with an arcuate recess 99 in substantial alignment with the recess 72 for a purpose as will be hereinafter set forth.

It will be apparent that coordinated rotation of the rods 56 and 58 in one common direction causes the door 70 to move in a lateral direction toward the door 88, and coordinated rotation of the rods 56 and 58 in an opposite direction causes the door 70 to move in a lateral direction away from the door 88. Similarly, a coordinated rotation of the rods 74 and 76 in one direction causes the door 88 to move in a lateral direction toward the door 70, and coordinated rotation of the rods 74 and 76 in an opposite direction causes the door 88 to move in a lateral direction away from the door 70. It will be further apparent that proper coordination between the rotation of the rods 56 and 58 with the rotation of the rods 76 and 76 will cause the doors 70 and 88 to move alternately toward one another and away from one another, for a purpose as will be hereinafter set forth.

A pair of spaced substantially horizontal rods 92 and 94 are rigidly or fixedly secured to the base 53 in substantially mutual parallel relationship, preferably with one rod 92 being disposed outwardly of the rail 24 and the other rod 94 being disposed outwardly of the rail 26, but not limited thereto. A plurality of apertured bearing sleeves or bosses 96 are slidably disposed on the rod 92 for reciprocation therealong, and similar bearing sleeves or bosses 98 are slidably disposed on the rod 94 for reciprocation therealong in coordinated relationship with the sleeves 96. The sleeves 96 are bolted or otherwise secured to a channel member 100, and the sleeves 98 are similarly secured to a channel member 102, with the channel members 100 and 102 being disposed substantially mutually parallel. The frame 54 is carried by or suitably secured to the channels 100 and 102 and moves simultaneously therewith during reciprocation of the sleeves 96 and 98 along the respective rods 92 and 94, as will be hereinafter set forth.

A first bull wheel 104 is carried by one end of a shaft 106 which is rotatably secured to the base 53 by a plurality of pillow block bearings 108, or the like. A second bull wheel 110 is carried by the opposite end of the shaft 106, as particularly shown in FIG. 3. The bull wheel 104 may be rotated about its axis in any suitable manner, such as a motor 112 and a pulley drive 114. It will be apparent that rotation of the wheel 104 will be transmitted to the wheel 110 by the shaft 106. A crank arm 116 has one end pivotally secured at 118 to the bull wheel 104 in the proximity of the outer periphery thereof whereby rotation of the wheel 104 moves the crank arm 116 in a to and fro movement. The opposite end 120 is pivotally secured to a lever arm or bell crank 122, which in turn is rigidly secured to the rod 56 and pivotally secured to the cross bar 68. A tie rod 124 has one end pivotally secured at 125 to the crank arm 116 at a point spaced from the end 120 thereof, and the opposite end of the tie rod 124 is pivotally secured to a bracket 126, which is fixedly or rigidly secured to the frame 54.

A second crank arm 128 has one end pivotally secured at 130 to the bull wheel 110 in the proximity of the outer periphery thereof. The opposite end of the crank arm 128 is pivotally secured at 132 to a bell crank or lever arm 134, which in turn is rigidly secured to the rod 74 and pivotally secured to the cross bar 86. A tie rod 136 has one end pivotally secured at 138 to the crank 128 spaced from the end 132 thereof. The opposite end of the tie rod 136 is pivotally secured to a bracket 140 provided on the frame 54.

As the wheel 104 is rotated by the motor 112 and drive means 114, the wheel 110 will be rotated simultaneously therewith and the throw of the crank arms 116 and 128 will first actuate the bell cranks 122 and 134 to simultaneously rotate the rods 56 and 73 in opposite directions whereby the doors 70 and 88 will move laterally toward each other, bringing the recesses 72 and 90 in closer proximity to each other. At the limit of the movement of the bell cranks 122 and 134 in this direction, the frame 54 will be moved in a direction toward the carriage assembly 12 and the sleeves 96 and 98 will slide along the rods 92 and 94 for guiding the movement of the frame 54. When the wheels 104 and 110 have completed one half a revolution, or have moved through an arc of 180 degrees, the crank arms 116 and 128 will stop their movement in the direction toward the carriage assembly 12, and as the wheels 104 and 110 being the second half revolution the crank arms 116 and 128 will begin to move in an opposite direction. Upon the reversal of the direction of movement for the crank arms 116 and 128, the bell cranks 122 and 134 will be rotated in reverse directions for rotating the rods 56 and 74 in simultaneous but opposite reverse directions, thus moving the doors 70 and 88 in directions away from each other and separating the recesses 72 and 90 for a purpose as will be hereinafter set forth. When the bell cranks 122 and 134 have reached the limit of their movement in this opposite direction, the frame 54 will begin to move in a direction away from the carriage assembly 12 and will move in this reverse direction until the wheels 104 and 110 have completed a revolution, at which time the cycle will begin again.

Of course, a suitable protective cover 141 may be provided for the wheel 104 and crank arm 116, if desired, and a similar cover (not shown) may be provided for the wheel 110 and crank arm 128.

Figure 5:
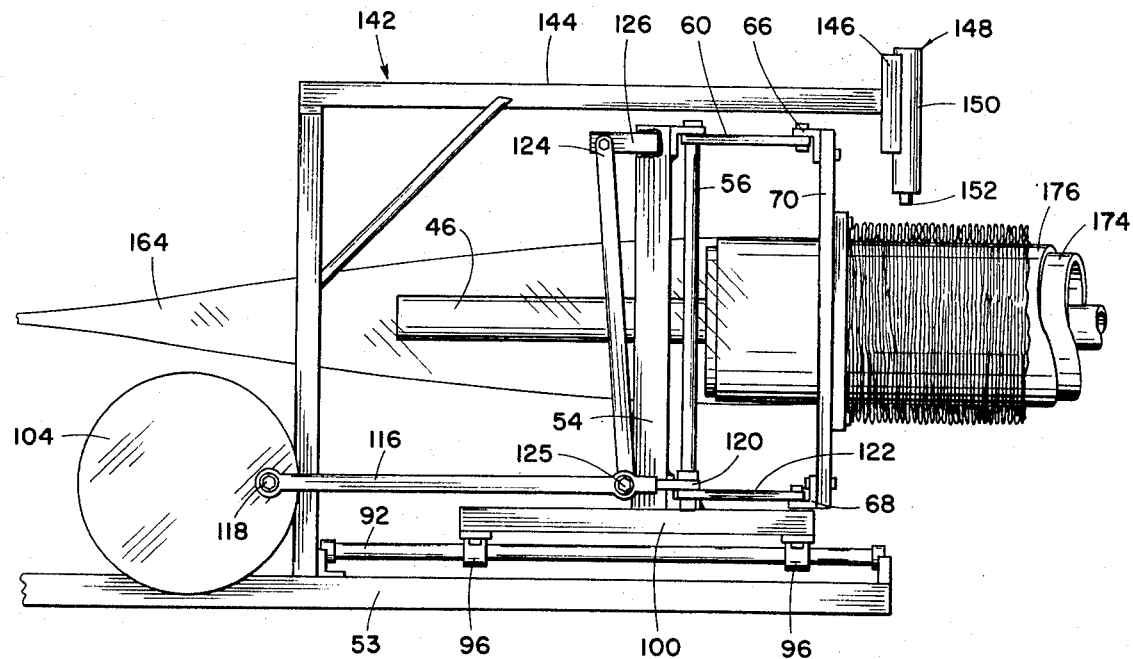
FIG. 5 is an enlarged side elevational view of the loading assembly of FIG. 1 depicting one position thereof with respect to a mandrel being loaded.
Figure 6:
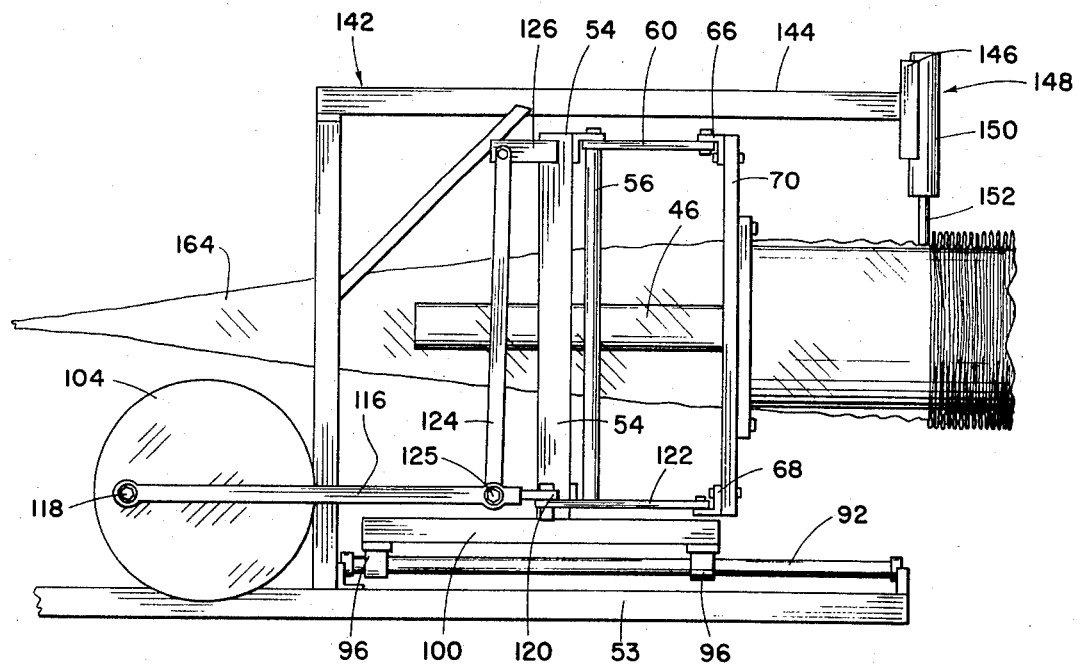
FIG. 6 is a view similar to FIG. 5 illustrating another position of the loading assembly with respect to a mandrel.

An overhead arm or boom 142 is suitably secured to the base 53 in any suitable or well known manner and the other end 144 thereof extends over and beyond the outermost reach of the frame 54 and doors 70 and 88, as particularly shown in FIGS. 3 and 5. A support bracket 148 is suitably secured on the outer end 144 of the boom 142 for receiving a plunger assembly 148. The plunger assembly 148 may be of any suitable type and as shown herein comprises an outer housing or sleeve 150 having a reciprocal plunger 152 disposed therein. The plunger 152 may be hydraulically, mechanically, pneumatically, or electrically actuated, as desired, for selective movement between a retracted position as shown in FIG. 5, and an extended position as shown in FIG. 6. The boom 142 is so disposed as to orientate the plunger 152 in a position substantially centrally disposed between the doors 70 and 88 and in a substantially vertical position for a purpose as will be hereinafter set forth. Of course, in the event the plunger assembly 148 is electrically actuated, the plunger 152 may be retracted and extended by the operation of a solenoid, or the like, (not shown), and as well known.

If desired, a control panel 154 may be suitably mounted on a support post 156 which may be secured to one of the rails, such as the rail 24, or otherwise secured in the proximity of the crammer assembly 14 or carriage assembly 12. The usual operating switch 158, and any other necessary controls (not shown) may be provided on the control panel 154 in order to facilitate the manual initiation of the operation of the apparatus 10, and the cessation of the operation thereof, as is well known.

It is also preferable to provide a suitable pedestal 160 spaced from the crammer assembly 14, as particularly shown in FIG. 1, for supporting a supply roll 162 of plastic film 164. The plastic film 164 is preferably in the form of seamless tubing, and the supply roll 160 is preferably supported on a plurality of rollers 166 suitably journalled on the pedestal 160. Thus, as the film 164 is pulled from the roll 162, the roll 162 may rotate about its own longitudinal axis and yet be maintained in position on the pedestal 160. In addition, it is desirable to provide a pressure roller 168 for yieldable engagement with the outer periphery of the supply roll 162 as the film 164 is pulled therefrom during a cramming operation. The roller 168 may be mounted in any suitable manner, and as shown herein is journalled on one end of a yoke member 170 which is yieldably and pivotally secired to a support post 172 in such a manner that the yoke 170 is constantly urged in a direction toward the supply roll 162 in order that the pressure roller 168 will be maintained in a normal position of engagement with the outer periphery of the roll 162.

Either of the rollers 166 or the roller 168 may be driven, if desired, to assist in dispensing the film 164 from the roll 162.

If it is desired to perform a cramming or loading operation on a spool having an inner diameter greater than the outer diameter of the mandrel 46 it will be first necessary to provide an auxiliary mandrel of the proper size. As shown in FIGS. 1, 2 and 5, this auxiliary mandrel consists of a pipe or cylindrical object 174 disposed around or on the mandrel 46 in concentric relationship therewith, and preferably with one end thereof in abutment with the plate 48. It will be apparent that it is desirable to provide a plurality of annular spacers (not shown) between the outer periphery of the mandrel 46 and the inner periphery of the pipe 174 for supporting the pipe 174 in concentrical relationship with the mandrel 46, as is well known. Now a loading spool 176 having an inner diameter substantially the same as the outer diameter of the auxiliary mandrel 174 is placed over the latter and slid rearwardly until the rear end thereof (not shown) abuts against the plate 48.

The leading end (not shown) of the plastic film 164 may be manually placed over or around the outer periphery of the loading spool 176 and secured thereto at the end thereof adjacent the plate 48. The carriage assembly 12 may then be disposed on the rails 24 and 26 in such a manner that the loading spool extends into and through the cramming or loading assembly 14. The turnbuckles 38 may then be properly adjusted, as hereinbefore set forth, to overcome any tendency of the pipe 174 and/or mandrel 46 to sag downwardly, and thus to position the spool 176 in a substantially horizontal position. The clutch 44 may then be manually adjusted in the well known manner for providing the desired rate of speed of the movement of the carriage 12 in a direction away from the cramming assembly 14 during the cramming operation, as hereinbefore set forth. In addition, the blower 52 may be acutated for moving a column of air through the manderl 46 and into the interior of the plastic film sleeve 164 for facilitating movement of the film 164 over the spool 176 during the loading operation.

The motor 112 and plunger assembly 148 may then be actuated by proper manipulation of the control panel 154 in order to start the loading or cramming operation. During the cramming operation, the frame 54 substantially continually moves to and fro as the wheels 104 and 110 are rotated. However, at the beginning of each throw of the cranks 116 and 128 in one direction, the frame 54 is stationary while the doors 70 and 88 are moved together, and at the beginning of the throw in an opposite direction, the frame 54 is stationary while the doors 70 and 88 move apart.

The resultant action or sequence of the operations of the cramming assembly 14 is as follows: initially the doors 70 and 88 are moved together whereby the arcuate recesses 72 and 90 are brought into engagement with the outer periphery of the film 164 disposed around the outer periphery of the spool 176. The doors 70 and 88 and frame 54 then move in a direction toward the carriage assembly 12 while the recesses 72 and 80 are in pressure engagement with the plastic film 164 and pipe 174, thus pushing or cramming the plastic sleeve or film 164 onto the spool 176 in an accordian fashion as particularly shown in FIGS. 5 and 6. When the doors 70 and 88 and frame 54 have reached the outermost limit of their movement in the direction toward the carriage assemly 12, the doors are moved away from each other, thus releasing the engagement of the recesses 72 and 90 with the film 164. The doors 70 and 88 then move in a direction away from the carriage assembly along with the frame 54 without any engagement between the recesses 72 and 90 and the film 164. When the doors have reached the limit of their movement in the direction away from the carriage assembly 12, they are moved together again whereby the recesses 72 and 90 once again engage the outer periphery of the film 164 to get another "bite"thereof and repeat the cramming operation for loading an additional length of the film 164 onto the spool 176. The operation is repeated until the desired length of film 164 has been crammed or loaded onto the pipe.

The plunger assembly 148 is operated in timed relationship with respect to the operation of the doors 70 and 88 whereby during the movement of the doors in the direction toward the carriage assembly 12, the plunger 152 is in the retracted position thereof as shown in FIG. 5, and there is no interference between the plunger 152 and the plastic film 164 being crammed onto the outer periphery of the spool. However, substantially simultaneously with the opening of the doors, or preferably slightly before the opening thereof, the plunger 152 is extended as shown in FIG. 6, and snaps into engagement with the outer periphery of the spool 176, with the film 164 being interposed between the plunger 152 and the spool. The plunger 152 thus securely retains the film 164 in the crammed position of the spool 176 as the doors move in the retrograde direction for picking up an additional bite of the plastic film 164. As soon as the doors 70 and 88 are once closed, or moved into engagement with the film 164 and spool 176, the plunger 152 is retracted to the initial position thereof.

It will be apparent as the film 164 is loaded onto the spool 176 it will be necessary to move the spool longitudinally away from the crammer assembly 14, as shown by comparison of FIGS. 5 and 6, in order that the desired total length of film 164 may be loaded onto the entire length of the spool 176. The pressure of the loaded film 164 on the spool 176 and acting longitudinally against the plate member 48 will automatically cause the spool 176 to push the carriage assembly 12 along the rails 24 and 26 in a direction away from the cramming assembly 14. Of course, the clutch 44 is adjusted as hereinbefore set forth, for controlling the rate of speed of the carriage assembly during the cramming operation. In addition, it may be desirable to provide a transversely extending stop member 173 on the rails 24 and 26 for engagement by the carriage assembly 12 in order to limit the movement of the carriage assembly in the direction away from the crammer assembly 14.

Figure 7:
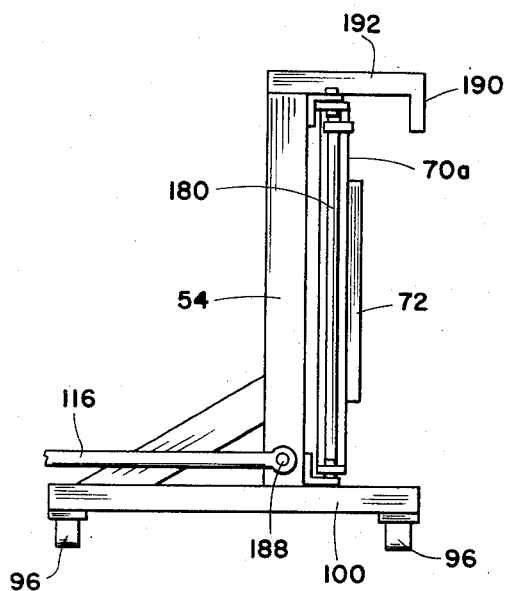
FIG. 7 is a side elevational view of another embodiment of the loading assembly.
Figure 8:
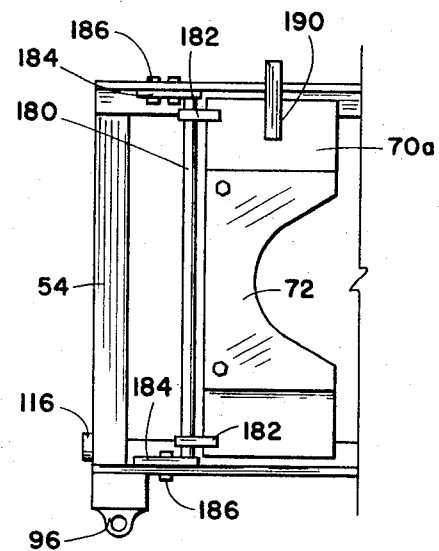
FIG. 8 is a front view of the left-hand portion of FIG. 7.

The loading or cramming assembly can take other forms than that specifically shown in FIGS. 1, 3, 4, 5 and 6. For example, if the parallelogram linkage best shown in FIG. 3 is eliminated and the doors 70 and 88 are hingedly mounted on the frame 54, the result shown in FIGS. 7 and 8 is obtained. More particularly, the door 70a is connected to a hinge shaft 180 by means of bars 182 which can be welded to the shaft 180 and connected to the door 70a by means of screws (not shown) or in any convenient manner. The ends of the hinge shaft are journalled in a pair of hinge blocks 184 which can be bolted to the horizontal portions of the frame member 54 be means of bolts 186. If desired, the bolts 186 could pass through slots (not shown) in the horizontal portions of the frame 54 to permit relative lateral adjustment of the doors 70a and 88a with respect to each other. The other door 88a (not shown) would be mounted on the frame 54 in mirror-image fashion.

The frame 54 is now directly connected to the crank arm 116 by means of a bolt 188 which constitutes a pivot point for the right-hand end of the crank arm.

If the frame 54 and associated structure were moved toward the right (with reference to FIG. 7), the inertia of the doors would cause them to pivot rearwardly towards the frame 54 and the arcuate portions 72 and 90 (not shown in FIG. 8) would be brought into engagement with the outer periphery of the film 164 (not shown in FIG. 8) disposed around the spool 176 (not shown in FIG. 8) to push or cram th plastic sleeve onto the spool in accordian fashion in substantially the same manner as described above in relation to FIGS. 5 and 6. When the frame 54 reaches its outermost limit of travel (towards the right with reference to FIG. 7) and the frame commences to move in the opposite direction towards the left, the inertia of the doors 70a and 88a would cause them to swing away from the plastic sleeve, although the plunger 152 would retain the film 168 in the crammed condition shown in FIG. 6.

In order to prevent the doors from swinging out too far on the return movement of the carriage, there are provided a pair of vertical arms 190 (only one of which is shown in FIGS. 7 and 8) disposed in the path of movement of the doors so as to constitute stops. Each arm 190 is connected to the end of a horizontal member 192 which is secured to the horizontal portion of the frame 54.

Figure 9:
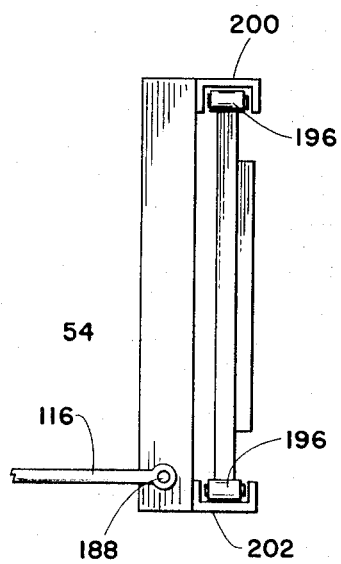
FIG. 9 is a side elevational view of still another embodiment of the loading assembly.
Figure 10:
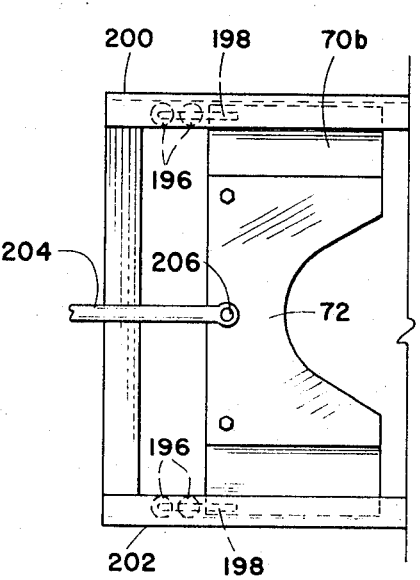
FIG. 10 is a front view of the left-hand portion of FIG. 9.

In FIGS. 9 and 10 is illustrated a still further embodiment of the present invention. Here the doors 70b and 88b (not shown in FIGS. 7 and 8) are laterally slidably mounted. For the sake of simplicity, only the frame 54 is shown in FIG. 9, but it should be understood that the frame is mounted on the channel member 100 in the same manner as shown in FIG. 7 and that it is capable of reciprocal movement through the crank arm 116 and pivotal connection 188 in a manner similar to that described above in relation to FIGS. 5 and 6.

Door 70b connects, at bottom and top, with rollers 196 journalled in roller frames 198 which are suitably connected to the door in any convenient manner. Attached to the horizontal portions of the frame 54 are channel members 200 and 202 which constitute tracks for the rollers 196.

Each door, such as door 70b, is reciprocated towards and away from the door by means of an arm 204 pivotally connected to the door at 206. The other door 88b (not shown) is mounted in mirror image fashion with respect to door 70b and is provided with a similar arm 204 (not shown) and pivotal connection 206 (not shown). The arms are connected by suitable linkage (not shown) to provide relative movement of the doors 70b and 88b towards and away from each other in timed relation to the movement of the frame 54. For example, a weight or weights (not shown) could be connected to the linkage referred to above to cause the doors to move towards each other as the frame 54 began to move towards the right (with reference to FIG. 9) from its left hand limit of travel; the same weight or weights, by an inertia effect, could cause the doors to move away from each other and, hence, out of engagement with the film 168, after reaching the other limit of travel and when commencing to move in the opposite direction. The doors of FIGS. 9 and 10 could also be driven by motors (not shown) or by cam arrangements to provide the same type of reciprocal motion described above.

From the foregoing it will be apparent that the present invention provides a novel loading apparatus for cramming or loading a relatively great length of plastic film onto a relatively short tubular member. The apparatus comprises a movable carriage assembly for supporting the tubular member during the cramming operation, a loading assembly for loading the plastic film onto the tubluar member, and a supply of plastic film for loading onto the tubular member. The loading assembly is provided with means for engaging the plastic film and pushing or cramming the film onto the outer periphery of the tubular member in an accordian type loading operation, holding the loaded film on the tubular member while the engaging means returns to an intial position for obtaining another bite on the plastic film, and repeating the process until the desired quantitity of film, and repeating the process until the desired quantitity of film has been loaded onto the tubular member.

Whereas the present invention has been described in particular relation to the drawings attached hereto, it should be understood that other and further modification, apart from those shown or suggested herein, may be made within the spirit and scope of this invention.

What is claimed is:

1. A device for loading a sleeve of plastic film onto a mandrel and comprising carriage means for supporting the mandrel in a substantially horizontal position, a loading assembly disposed in substantial alignment with the carriage means for movably receiving the mandrel and plastic film sleeve therein, reciprocating means for moving the loading assembly relatively towards and away from said carriage means, film engaging means carried by the loading assembly for loading the film onto the mandrel, connecting means provided on the loading assembly and operably connected with the film engaging means for moving the film engaging means inwardly into engagement with the film as said loading assembly is moved relatively towards said carriage means for loading of the film onto the mandrel in an accordian type operation, said connecting means moving said film engaging means outwardly away from said film as said loading assembly is moved relatively away from said carriage, whereby a relatively great length of film sleeve may be loaded onto a relatively short mandrel, and blower means provided on the carriage means for moving a column of air through the mandrel and into the plastic sleeve being loaded thereon for facilitating the loading operation.

2. A device for loading a sleeve of plastic film onto a mandrel and comprising carriage means for supporting the mandrel in a substantially horizontal position, a loading assembly disposed in substantial alignment with the carriage means for movably receiving the mandrel and plastic film sleeve therein, reciprocating means for moving the loading assembly relatively towards and away from said carriage means, film engaging means carried by the loading assembly for loading the film onto the mandrel, connecting means provided on the loading assembly and operably connected with the film engaging means for moving the film engaging means inwardly into engagement with the film as said loading assembly is moved relatively towards said carriage means for loading of the film onto the mandrel in an accordian type operation, said connecting means moving said film engaging means outwardly away from said film as said loading assembly is moved relatively away from said carriage, whereby a relatively great length of film sleeve may be loaded onto a relatively short mandrel, said carriage means being independently movable in directions toward and away from the loading assembly.

3. A device for loading plastic film sleeve onto a mandrel as set forth in claim 2 and including clutch means provided on the carriage means for controlling the rate of movement thereof.

4. A device for loading a sleeve of plastic film onto a mandrel and comprising carriage means for supporting the mandrel in a substantially horizontal position, a loading assembly disposed in substantial alignment with the carriage means for movably receiving the mandrel and plastic film sleeve therein, reciprocation means for moving the loading assembly relatively towards and away from said carriage means, film engaging means carried by the loading assembly for loading the film onto the mandrel, connecting means provided on the loading assembly and operably connected with the film engaging means for moving the film engaging means inwardly into engagement with the film as said loading assembly is moved relatively towards said carriage means for loading of the film onto the mandrel in an accordian type operation, said connecting means moving said film engaging means outwardly away from said film as said loading assembly is moved relatively away from said carriage, whereby a relatively great length of film sleeve may be loaded onto a relatively short mandrel, and downwardly movable plunger means carried by the loading assembly and operable in synchronization therewith to move downwardly into engagement with the accordian loaded portion of said film as said loading assembly is moved relatively away from said carriage means for retaining the loaded portion of the film of the mandrel.

5. A device for loading a sleeve of plastic film onto a mandrel and comprising carriage means for supporting the mandrel in a substantially horizontal position, a loading assembly disposed in substantial alignment with the carriage means for movably receiving the mandrel and plastic film sleeve therein, reciprocating means for moving the loading assembly relatively towards and away from said carriage means, film engaging means carried by the loading assembly for loading the film onto the mandrel, connecting means provided on the loading assembly and operably connected with the film engaging means for moving the film engaging means inwardly into engagement with the film as said loading assembly is moved relatively towards said carriage means for loading of the film onto the mandrel in an accordian type operation, said connecting means moving said film engaging means relatively away from said carriage, whereby a relatively great length of film sleeve may be loaded onto a relatively short mandrel, said film engaging means comprising a pair of oppositely disposed upright doors movable in opposite synchronized lateral directions, said doors being provided with arcuate recesses on the inwardly directed edges thereof for selective engagement with the plastic film during a loading operation, frame means movable in a to and fro action for supporting the doors, means cooperating between the frame and the doors to provide said lateral movement therefor, and means operably connected to the frame for supporting thereof during said to and fro movement.

6. A device for loading plastic film sleeve onto a mandrel as set forth in claim 5 wherein the means for providing said to and fro and inwardly and outwardly movement comprises rotatable wheel means, crank arm means operably connected between the wheel means and doors to provide said lateral movement therefor and between the wheel means and frame means to provide said to and fro movement therefor.

7. A device for loading a sleeve of plastic film onto a mandrel and comprising carriage means for supporting the mandrel in a substantially horizontal position, a loading assembly disposed in substantial alignment with the carriage means for movably receiving the mandrel and plastic film sleeve therein, reciprocation means for moving the loading assembly relatively towards and away from said carriage means, film engaging means carried by the loading assembly for loading the film onto the mandrel, connecting means provided on the loading assembly and operably connected with the film engaging means for moving the film engaging means inwardly into engagement with the film as said loading assembly is moved relatively towards said carriage means for loading of the film onto the mandrel in an accordian type operation, said connecting means moving said film engaging means outwardly away from said film as said loading assembly is moved relatively away from said carriage, whereby a relatively great length of film sleeve may be loaded onto a relatively short mandrel, said loading assembly comprising a base member, substantially horizontally disposed rod means provided on said base member, sleeve means slidably disposed on said rod means, said film engaging means being carried by said sleeve means for movement simultaneously therewith and comprising upright frame means sucured to the sleeve means, a pair of upright door members carried by the frame means and having complementary recesses on the inwardly directed edges thereof for engaging the plastic film sleeve, means connecting the doors with the frame means for inward and outward movement of the doors in alternate directions away from and toward each other, drive means, and crank arm means operably connected between the drive means and the frame means to provide to and fro movement thereto and between the drive means and the doors to provide said inward and outward movement therefor.

8. A device for loading a sleeve of plastic film onto a mandrel and comprising carriage means for supporting the mandrel in a substantially horizontal position, a loading assembly disposed in substantial alignment with the carriage means for movably receiving the mandrel and plastic film sleeve therein, reciprocating means for moving the loading assembly relatively towards and away from said carriage means, film engaging means carried by the loading assembly for loading the film onto the mandrel, connecting means provided on the loading assembly and operably connected with the film engaging means for moving the film engaging means inwardly into engagement with the film as said loading assembly is moved relatively towards said carriage means for loading of the film onto the mandrel in an accordian type operation, said connecting means moving said film engaging means outwardly away from said film as said loading assembly is moved relatively away from said carriage, whereby a relatively great length of film sleeve may be loaded onto a relatively short mandrel, said film engaging means comprising a frame means, a pair of oppositely disposed upright doors, said doors being provided with arcuate recesses on the inwardly directed edges thereof for selective engagement with the plastic film during a loading operation, and hinge means mounting said doors on said frame means for limited swinging movement of said doors away from said frame means towards said carriage means.

9. A device for loading a sleeve of plastic film onto a mandrel and comprising carriage means for supporting the mandrel in a substantially horizontal position, a loading assembly disposed in substantial alignment with the carriage means for movably receiving the mandrel and plastic film sleeve therein, reciprocating means for moving the loading assembly relatively towards and away from said carriage means, film engaging means carried by the loading assembly for loading the film onto the mandrel, connecting means provided on the loading assembly and operably connected with the film engaging means for moving the film engaging means inwardly into engagement with the film as said loading assembly is moved relatively towards said carriage means for loading of the film onto the mandrel in an accordian type operation, said connecting means moving said film engaging means outwardly away from said film as said loading assembly is moved relatively away from said carriage, whereby a relatively great length of film sleeve may be loaded onto a relatively short mandrel, said film engaging means comprising a frame means, a pair of oppositely disposed upright doors, said doors being provided with arcuate recesses on the inwardly directed edges thereof for selective engagement with the plastic film during a loading operation, means slidably mounting said doors in said frame for movement of said doors towards and away from each other, and door moving means operable in synchronism with the relative movement of said loading means towards said carriage means to move said doors towards each other and with the relative movement of said loading means away from said carriage means to move said doors away from each other.

* * * * *